(12) United States Patent
Uhlhorn et al.

(10) Patent No.: US 8,229,259 B1
(45) Date of Patent: Jul. 24, 2012

(54) TAMPER SENSING DEVICE

(75) Inventors: Brian L. Uhlhorn, St. Paul, MN (US); Howard J. Schantz, Inver Grove Heights, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 374 days.

(21) Appl. No.: 12/607,397

(22) Filed: Oct. 28, 2009

(51) Int. Cl.
*G02B 6/26* (2006.01)

(52) U.S. Cl. ............... 385/19; 385/15; 385/31; 385/35; 385/140

(58) Field of Classification Search ............... 385/25, 385/15, 16, 19, 12, 140, 31, 33, 35
See application file for complete search history.

(56) References Cited

U.S. PATENT DOCUMENTS

| | | | | |
|---|---|---|---|---|
| 4,702,549 A | * | 10/1987 | Duck et al. ............... | 385/140 |
| 5,361,315 A | * | 11/1994 | Lewis et al. ............... | 385/16 |
| 6,275,320 B1 | * | 8/2001 | Dhuler et al. ............... | 359/237 |
| 6,301,425 B1 | * | 10/2001 | Espindola et al. ............... | 385/140 |
| 6,782,185 B2 | * | 8/2004 | Katayama et al. ............... | 385/140 |
| 6,876,810 B2 | * | 4/2005 | Morimoto et al. ............... | 385/140 |
| 7,394,060 B2 | | 7/2008 | Beinhocker | |
| 7,466,890 B2 | | 12/2008 | Kachmar | |
| 2002/0110347 A1 | * | 8/2002 | Morimoto et al. ............... | 385/140 |
| 2008/0132118 A1 | | 6/2008 | Dalzell et al. | |

* cited by examiner

*Primary Examiner* — Brian Healy
(74) *Attorney, Agent, or Firm* — Hamre, Schumann, Mueller & Larson, P.C.

(57) ABSTRACT

A device having a case, an input optical fiber and an output optical fiber and a light path extending between the input and output optical fiber. A light path interrupting element is disposed within the case and is movable from a first position at which it interrupts a portion of the light path so that a first amount of light can reach the output optical fiber to a second position at which a second amount of light can reach the output optical fiber. A retainer is moveable relative to the case from a retaining position to a disengaged position. At the retaining position the retainer is engaged with the light path interrupting element to retain the light path interrupting element at the first position, and at the disengaged position the retainer is disengaged from the light path interrupting element and the light path interrupting element is at the second position.

20 Claims, 9 Drawing Sheets

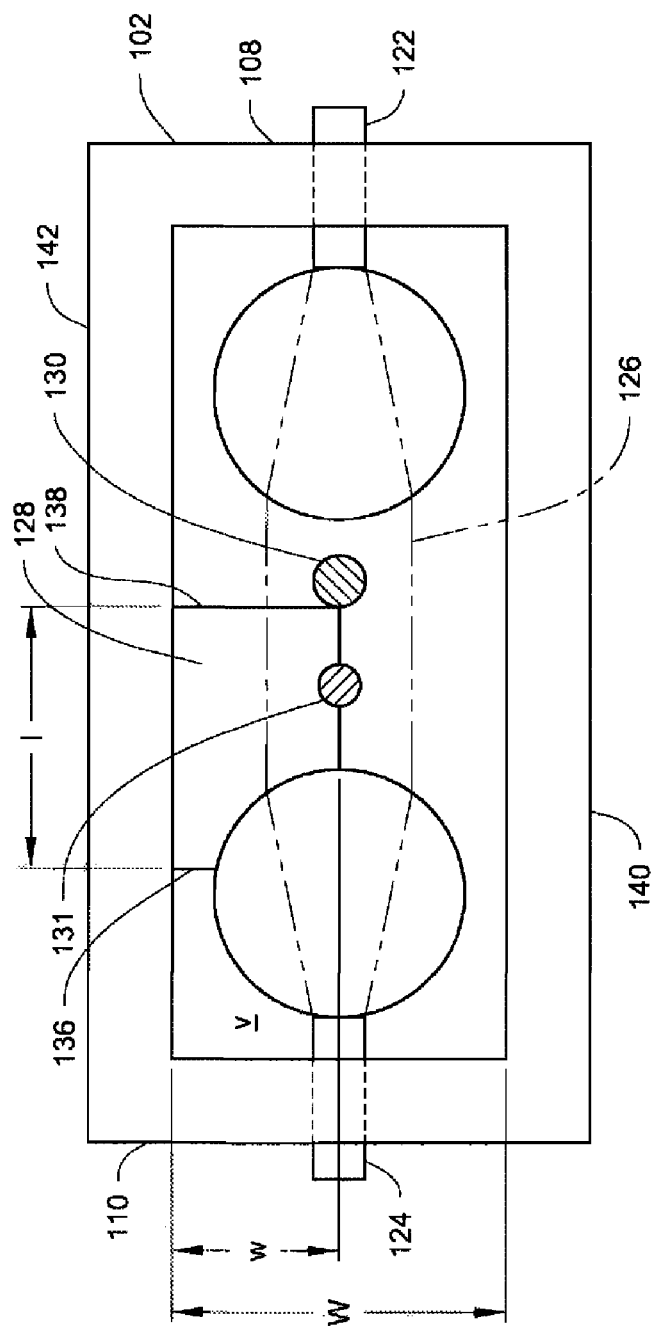
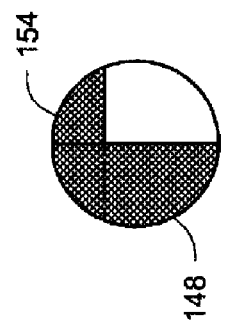

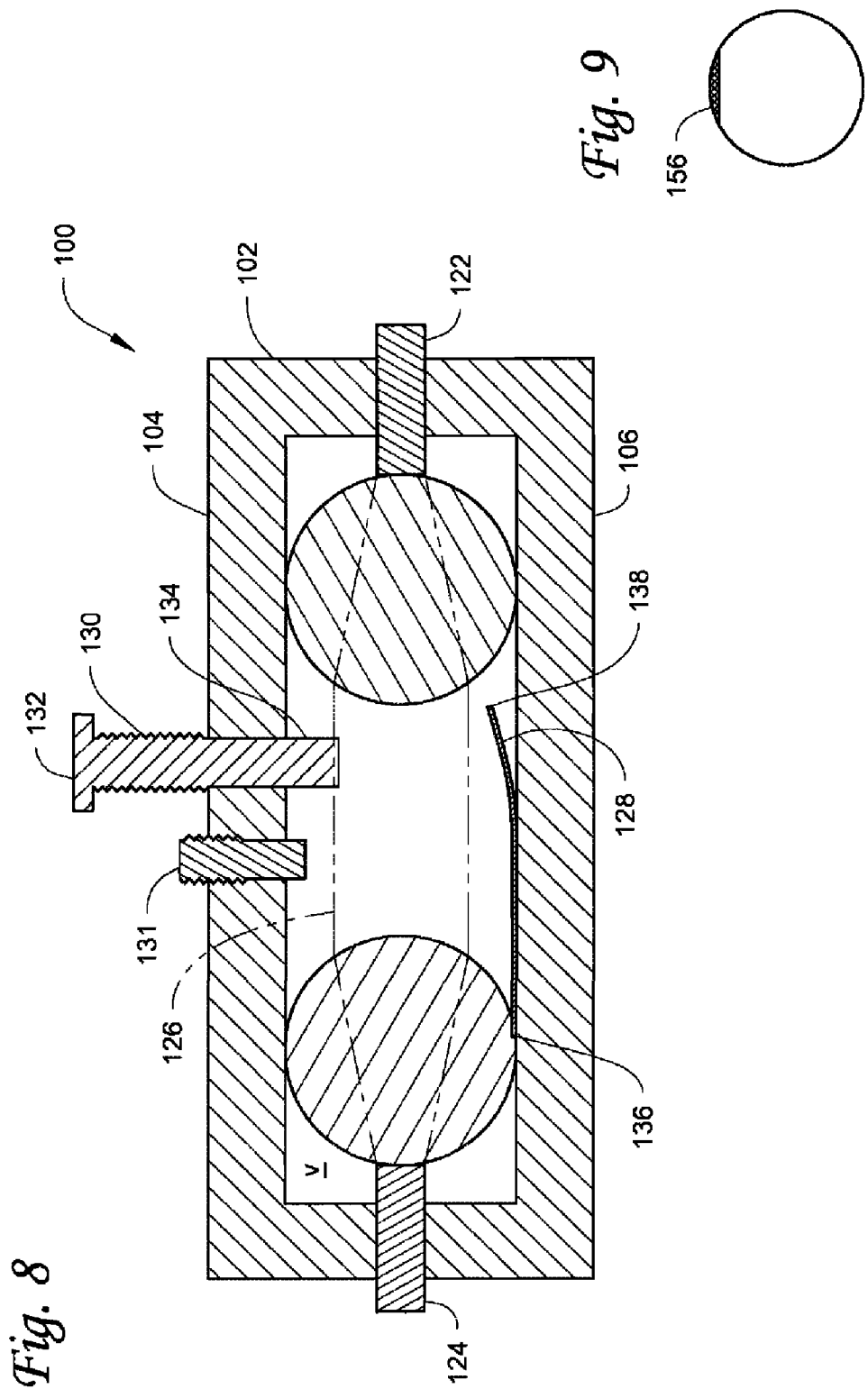

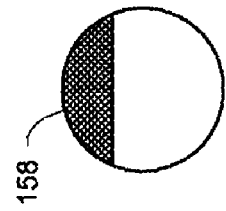
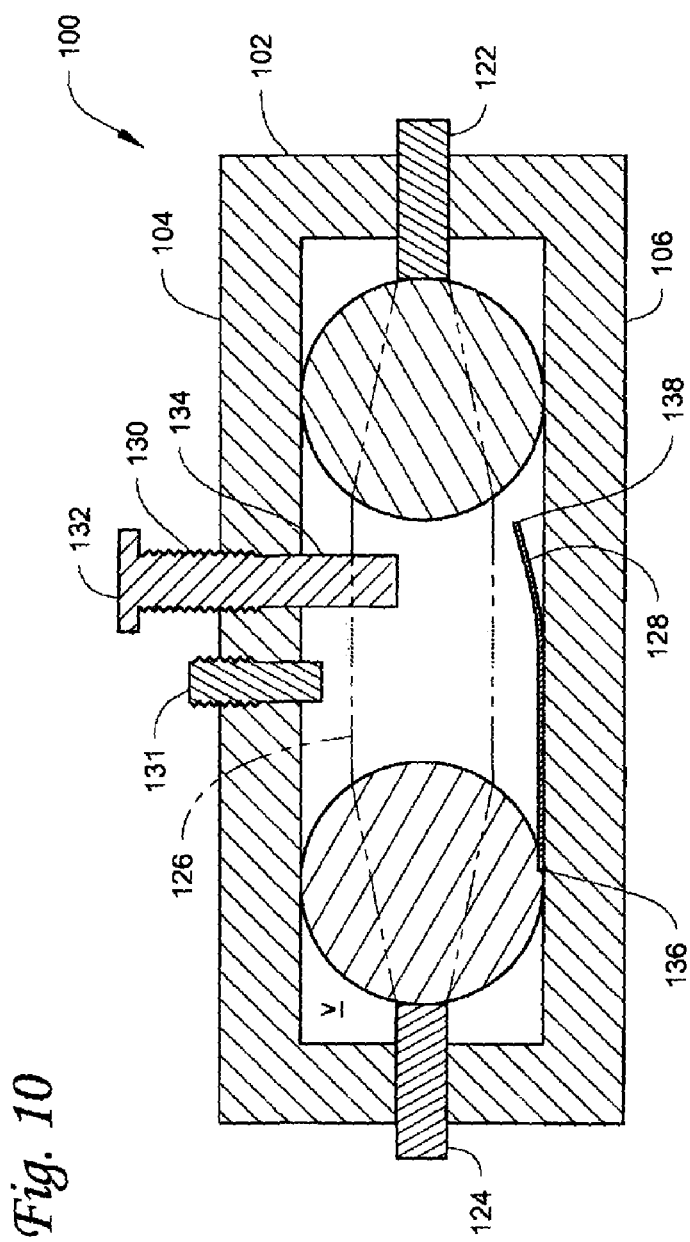

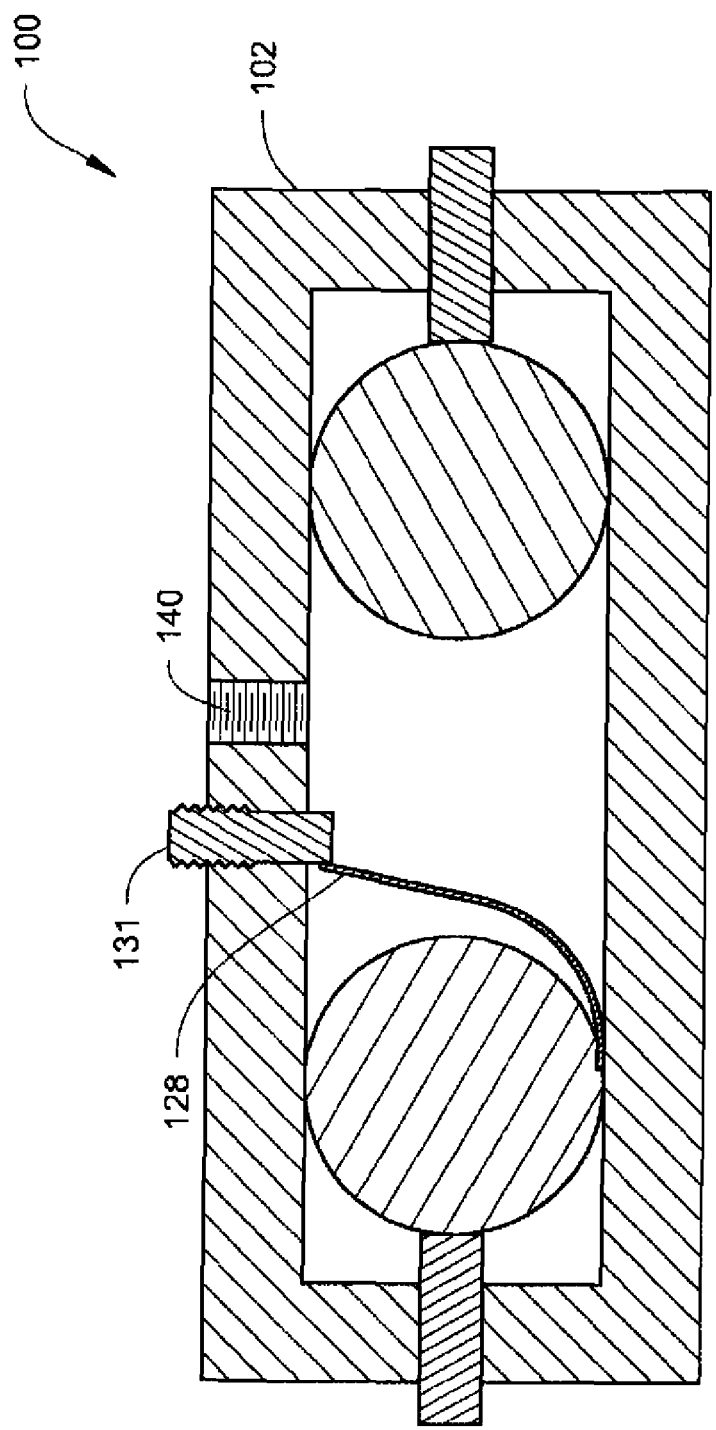

TAMPER SENSING DEVICE

FIELD

This disclosure relates to a tamper sensing device that senses attenuation in light to detect a tamper event.

BACKGROUND

A number of devices exist that may be used to detect tamper events in devices or boxes that utilize optical fibers for internal and external communication. One such device is illustrated in FIG. 1. FIG. 1 shows a cross section view of a tamper sensing device 10. The device 10 comprises a case 12 that has a top 14 wall, a bottom wall 16 and side walls 18 and 20 which define an enclosed volume (v). Extending into the volume is an input optical fiber 22 and an output optical fiber 24. A light path 26 exists between the input and output optical fibers 22 and 24. An input lens 28 exists adjacent the input optical fiber 22 and an output lens 30 exists adjacent the output fiber 24. The input and output lenses 28 and 30 collimate the light path 26 that exists between the input and output optical fibers 22 and 24. A case screw 32 having a screw head 34 and screw body 36 is inserted into the top wall 14 of the case 12 so that part of the screw body 36 is in the volume (v) and blocks part of the light path 26. The device is capable of attenuating the amount of light that reaches the second optical fiber 24 allowing the device to sense a tamper event. FIG. 2 shows the amount of light received by the output fiber 24 when the case screw 32 partially blocks the light path 26 as shown in FIG. 1. If someone tries to tamper with the device 10 by trying to remove the case screw 32, the case screw 32 will change positions and affect the amount of light reaching the output optical fiber 24. The problem with the tamper sensing device 10 is that after removing the case screw 32, the case screw 32 can be reset to conceal the tamper event.

FIG. 3 shows another tamper sensing device 50 used to detect a tamper event within an optical system. Device 50 shows a case screw 52 that has a screw head 54 and a screw body 56 and a hole 58 through the screw body 56. A fiber optic cable 60 travels through the hole 58, lithe screw 52 is removed, the fiber optic cable 60 breaks. However, because the tamper event breaks the fiber optic cable 60 it also prevents data from traveling over cable 60 which is not ideal.

FIG. 4 is an exploded perspective view of an example environment 70 in which a tamper sensing device 72 such as the devices shown in FIGS. 1 and 3 is used. The tamper sensing device 72 sits on a support structure 74 inside of a box 76 that has a lid 78. A case screw 80 is used secure the lid 78 onto the box 76 through a screw hole 82 that extends into device 72. The box 76 contains a fiber optic system. The tamper sensing device 72 detects if someone removes or tries to remove the screw 80 to get inside the box 76.

SUMMARY

A tamper sensing device is described which detects a tampering event by sensing light attenuation caused by movement of a light path interrupting element between a first and second position through a light path. This movement of the light path interrupting element changes the amount of light that reaches an output and the changes can be sensed to detect a possible tampering event. The tamper sensing device may be disposed in an environment such as that shown in FIG. 4. A tampering event is when someone or something tries to "break into" the environment in which the tamper sensing device is disposed.

One embodiment of the tamper sensing device comprises a case defining an enclosed volume. An input optical fiber is connected to the case and extends into the volume. An output optical fiber is also connected to the case and extends into the volume. A light path extends between the input optical fiber and the output optical fiber. A light path interrupting element is disposed within the enclosed volume, the light path interrupting element is movable from a first position at which it interrupts at least a portion of the light path so that a first amount of light can reach the output optical fiber to a second position at which a second amount of light can reach the output optical fiber. The first amount is different than the second amount. A retainer extends through the case and into the interior volume, the retainer is moveable relative to the case from a retaining position to a disengaged position, and at the retaining position the retainer is engaged with the light path interrupting element to retain the light path interrupting element at the first position, and at the disengaged position the retainer is disengaged from the light path interrupting element and the light path interrupting element is at the second position.

A second embodiment of the tamper sensing device comprises a case defining an enclosed volume. A light input means extends into the volume and introduces light into the volume. A light output means extends from the volume and receives light from the light input means. A light path exists between the light input means and the light receiving means within the volume. A light path interrupting means for interrupting the light path is disposed within the enclosed volume. The light path interrupting means is movable from a first position at which it interrupts at least a portion of the light path so that a first amount of light can reach the output optical fiber to a second position at which a second amount of light can reach the output optical fiber. The first amount of light is different than the second amount. A retaining means is disposed in the volume for retaining the light interrupting means at the first position. The retaining means is moveable relative to the case from a retaining position to a disengaged position. At the retaining position the retaining means is engaged with the light path interrupting means to retain the light path interrupting means at the first position. At the disengaged position, the retaining means is disengaged from the light path interrupting means and the light path interrupting means is at the second position.

A third embodiment of the tamper sensing device comprises a case defining an enclosed volume. An input optical fiber is connected to the case and extends into the volume. An output optical fiber is connected to the case and extends into the volume. The input optical fiber is located opposite the output optical fiber. A light path exists between the input optical fiber and the output optical fiber. A light beam carries data input via the input optical fiber and travels along the light path to the output optical fiber. An input lens is located within the volume adjacent the input optical fiber and an output lens is located within the volume adjacent the output optical fiber. A light path interrupting element is disposed within the enclosed volume. The light path interrupting element is movable from a first position at which it interrupts at least a portion of the light path so that a first amount of light can reach the output optical fiber to a second position at which a second amount of light can reach the output optical fiber. The first amount of light is different than the second amount of light. A retainer extends through the case and into the interior volume. The retainer is moveable relative to the case from a retaining position to a disengaged position. At the retaining position, the retainer is engaged with the light path interrupting element to retain the light path interrupting element at the first position. At the disengaged position, the retainer is disengaged from the light path interrupting element and the light path interrupting element is at the second position.

DRAWINGS

FIG. 6 is a top view of FIG. 5.

FIG. 7 shows the amount of light reaching the output optical fiber in FIG. 5.

FIG. 8 is a cross-sectional view of the device when it has been triggered by a tampering event.

FIG. 9 is the amount of light reaching the output optical fiber in FIG. 8.

FIG. 10 shows a cross sectional view of the device where someone tried to conceal the tampering event.

FIG. 11 shows the amount of light reaching the output optical fiber in FIG. 10.

FIG. 12 shows the first step in arming the device.

DETAILED DESCRIPTION

Figure 2:
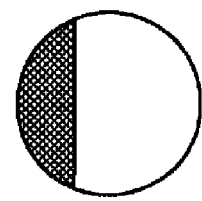
FIG. 2 shows an amount of light sensed by the tamper sensing device shown in FIG. 1.
Figure 1:
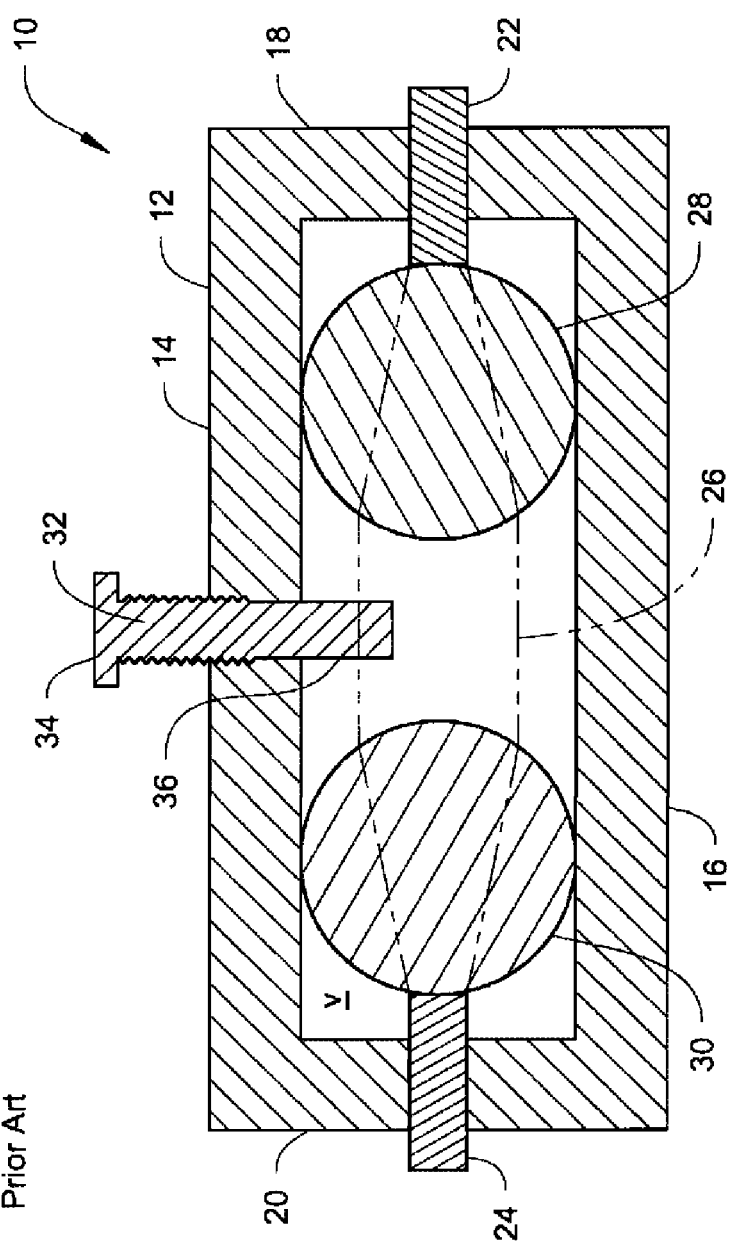
FIG. 1 is a cross-section view of a tamper sensing device in the prior art.
Figure 4:
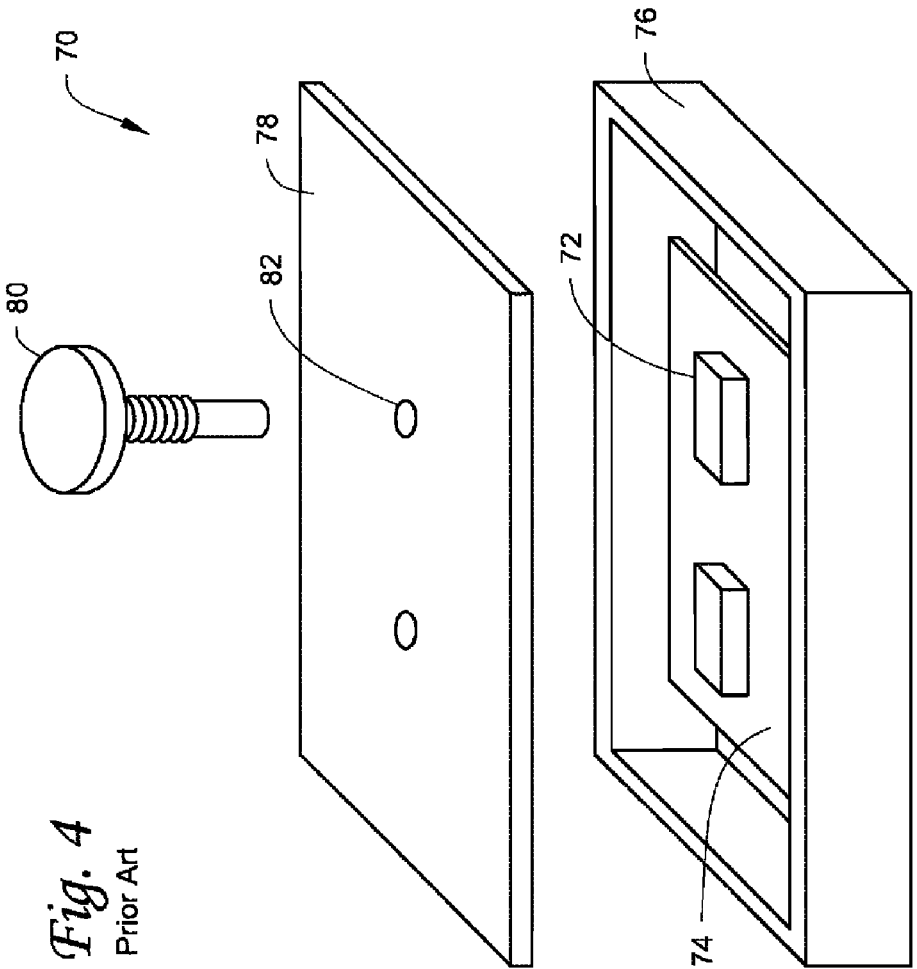
FIG. 4 is an exploded perspective view of an example environment in which a tamper sensing device is used.
Figure 3:
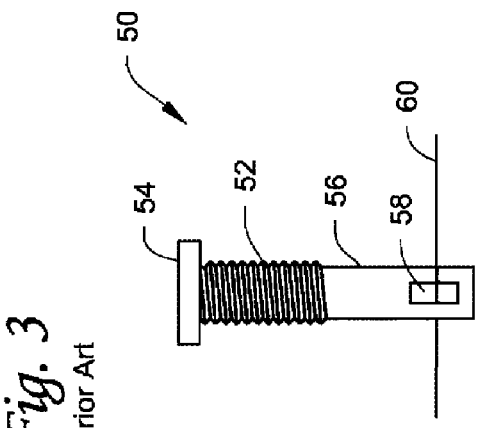
FIG. 3 is a side view detail of a tamper sensing device in the prior art.

A tamper sensing device is described which detects a tampering event by sensing light attenuation caused by movement of a light blocking element between a first and second position through a light path. This movement of the light blocking element changes the amount of light that reaches an output and the changes can be sensed to detect a possible tampering event. The tamper sensing device may be disposed in an environment such as that shown in FIG. 4. A tampering event is when someone or something tries to "break into" the environment in which the tamper sensing device is disposed.

Figure 5:
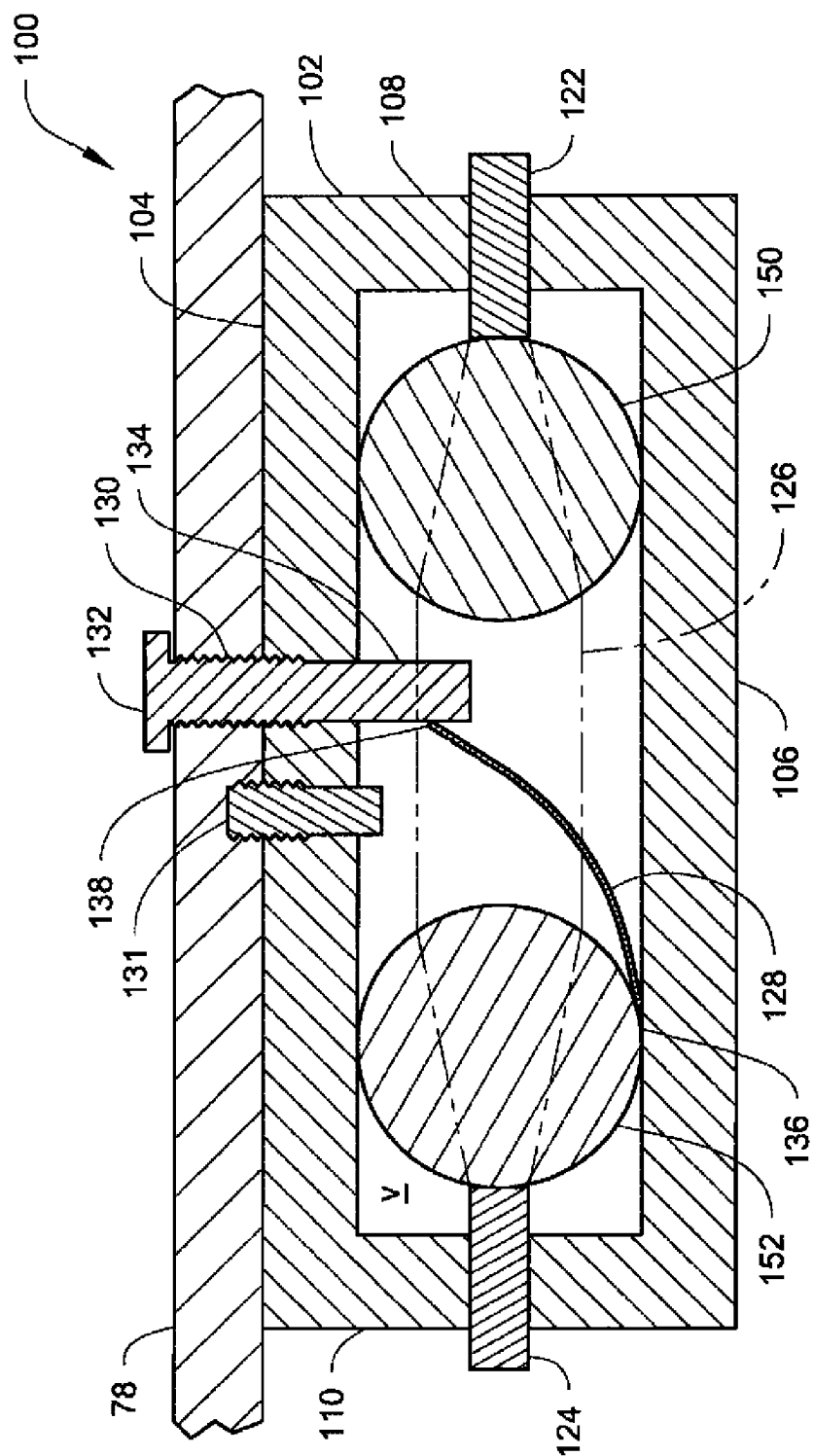
FIG. 5 is a cross sectional view of the described tamper sensing device when it is armed.

FIGS. 5-14 each refer to the same tamper sensing device 100 and will be used interchangeably when describing the device 100 herein. FIG. 5 shows a cross sectional view of the tamper sensing device 100 as it exists before a tampering event. The device 100 comprises a case 102 having an enclosed volume (v), an input optical fiber 122, an output optical fiber 124, a light path 126 between the input and output optical fibers 122 and 124, a light path interrupting element 128, a retainer 130 and a set screw 131. In one example the input 122 and output fibers 124 are located directly across from each other, however, they can be located anywhere within the case 102 as long as they are capable of forming a light path 126 between the two. In the following figures, an input lens 150 is shown adjacent the input optical fiber 122 and an output lens 152 is shown adjacent the output optical fiber 124. These lenses are optional and may be used to focus the light path 126. The light path introduced through fiber 122 may include data.

Case 102 may be any shape as long as it has at least one wall and an enclosed volume. For example it can be rectangular, square or spherical. FIGS. 5, 8, 10 and 12-14, case 102 is shown as a rectangular box. The figures show case 102 having a top wall 104, a bottom wall 106 and side walls 108 and 110. FIG. 6 is a top view of the tamper sensing device 100 and shows additional side walls 140 and 142. The input optical fiber 122 is connected to the case 102 and extends into the volume (v) through first wall 108. The output optical fiber 124 is also connected to the case 102 and extends into the volume (v) through wall 110. The light path 126 extends between the input optical fiber 122 and the output optical fiber 124.

The light path interrupting element 128 has a first end 136, a second end 138, a length (l) and a width (w) as shown in FIG. 6. The second end 138 of the light path interrupting element 128 is capable of moving from a first position (FIG. 5) to a second position (FIG. 8) within the case 102.

The retainer 130 has a top 132 and a body 134 and is moveable independently from the case 102 between an engaged position (FIG. 5), a first disengaged position (FIG. 8) and a second disengaged position (FIG. 10). The retainer 130 functions like the case screw 80 in FIG. 4 that is used to secure the lid 78 to the box 76 by extending into device 72. FIGS. 5, 8, and 10 show the retainer 130 extending through the lid 78 and the top wall 104 of the case 102 and into the enclosed the volume (v). The retainer 130 is not limited to extending through the top wall 104. The body 134 of retainer 130 may or may not enter the light path 126. The retainer 130 need not be centered on the top wall 104 of the case 102. The retainer 130 can be inserted anywhere through the case 102 so long as it is capable of holding at least part of the light path interrupting element 128 in the light path 126 when it is in its engaged position. The retainer 130 may be a nail, screw, rivet, bolt, pin or some other kind of fastener capable of penetrating through the case 102 and which is moveable between two positions.

FIG. 5 is a cross sectional view of device 100 when it is fully armed, meaning that the light path interrupting element 128 is in its first position and the retainer 130 is in its engaged position. The first end 136 of the light path interrupting element 128 is located on the bottom wall 106 and the second end 138 is in engaged with the retainer 130 such that the light path interrupting element 128 blocks at least part of the light path 126 traveling from the input optical fiber 122 to the output optical fiber 124.

FIG. 6 is a top view of FIG. 5 and shows the width (w) of the light interrupting element 128 extending about halfway across the width W of the case. However, the light interrupting element 128 can be of any width as long as it blocks at least some of the light path 126 when the second end 138 is engaged with the retainer 130 (i.e. the light path interrupting element is in its first position). Retainer 130 can extend into the case 102 through any wall as long as it is capable of holding the light interrupting element 128 in its first position in the light path 126 between the input and output optical fibers 122 and 124. In one example, the light path interrupting element 128 is a flap that is spring loaded and held in place by the retainer 130. However, the light path interrupting element 128 does not need to be spring loaded as long as it changes positions upon the retainer 130 moving to its first disengaged position. FIG. 6 shows the retainer 130 and set screw 131 off-center of the light path 126. However, retainer 130 and set screw 131 can be located anywhere through the case 102 as long as the retainer 130 is capable of holding light interrupting element 128 in its first position in the light path 126.

FIG. 7 shows the amount of light from the light path 126 that reaches output optical fiber 124 when the light path interrupting element 128 is in its first position and the retainer 130 is in its engaged position. FIG. 7 shows a vertical shadow 148 and a horizontal shadow 154. The vertical shadow 148 is caused by the light path being blocked by a portion of the light path interrupting element 128. The horizontal shadow 154 is caused by the light path 126 being blocked partially by the body 134 of the retainer 130.

FIG. 8 is a cross-sectional view of the device 100 when the device 100 has been triggered by someone removing or attempting to remove the retainer 130 from the case 102. When someone attempts to move the retainer 130 out of the case 102, the light path interrupting element 128 moves to its second position and the retainer 130 moves to its first disengaged position. The first disengaged position is when the retainer 130 has been moved such that it no longer engages the light interrupting element 128 in the same way that it did in its first engaged position. The retainer 130 may still engage the light interrupting element 128 in its first disengaged position as long as a different amount of light from the light path 126 reaches the output optical fiber 124 and the light path interrupting element 128 is incapable of moving back to its first position. This also includes positions in which the retainer 130 has no contact with the light interrupting element 128 as illustrated in FIG. 8.

The light path interrupting element 128 is in its second position when the second end 138 of the light path interrupting element moves within the case 102 such that a different amount of light from the light path 126 reaches the output optical fiber 124. FIG. 8 shows the second position of the second end 138 of the light path interrupting element to be no longer in contact with the retainer 130. However, the second position of the second end 138 could be located anywhere within the volume (v) so long as the amount of light reaching the output optical fiber 124 differs from the amount of light that reached the output optical fiber 124 when the second end 138 of the light path interrupting element 128 was in its first position. The second position also means that the light path interrupting element 128 is incapable of moving back to its first position on its own. FIG. 8 shows the second end 138 to be adjacent the bottom wall 106 when it is in its second position.

FIG. 9 shows an example of the amount of light from the light path 126 that reaches output optical fiber 124 when the light path interrupting element 128 is in its second position and the retainer 130 is in its first disengaged position. FIG. 9, for example, shows a small horizontal shadow 156. The horizontal shadow 156 is caused by the light path 126 being blocked partially by the body 134 of the retainer 130. However, the vertical shadow 148 that appeared in FIG. 7 is no longer visible because the light path interrupting element 128 has moved out of the light path 126 allowing more light to reach the output optical fiber 124.

FIG. 10 shows a cross sectional view of the device 100 in which someone has reinserted the retainer 130 into the case 102 so as to cover up the tampering event. The light path interrupting element 128 is in its second position and the retainer 130 is in its second disengaged position. The second disengaged position is when the retainer 130 is put back to the same or approximately the same position as when it was in its engaged position. For example, the retainer 130 could be moved back to the same position as it was in FIG. 5. Because the second end 138 of the light path interrupting element 128 remains in its second position, the amount of light reaching the output optical fiber 124 is still different from the amount of light reaching output optical fiber 124 when the device 100 was fully armed in FIG. 5.

FIG. 11 shows an example of the amount of light from the light path 126 that reaches output optical fiber 124 when the light path interrupting element 128 is in its second position and the retainer 130 is in its second disengaged position. FIG. 11 for example shows a horizontal shadow 158. The horizontal shadow 158 is caused by the light path 126 being blocked partially by the body 134 of the retainer 130. However, the vertical shadow 148 that appeared in FIG. 7 is no longer visible because the light interrupting element 128 has moved out of the light path 126 allowing more light to reach the output optical fiber 124.

Thus if someone tries to remove the retainer 130 from device 100 such that the retainer 130 moves to its first disengaged position, the device 100 can capture the different attenuation in the light path 126 caused by the light path interrupting element 128 having moved to its second position. For example, the light interrupting element 128 may be made of a material such that it is released into its second position when the retainer 130 is moved out of the case 102. If someone tries to cover up the removal of the retainer 130 by reinserting the retainer within the case 102, the removal of the retainer 130 can still be captured because the amount of light reaching the output optical fiber 124 is different than it was before the removal of the retainer 130.

Figure 13:
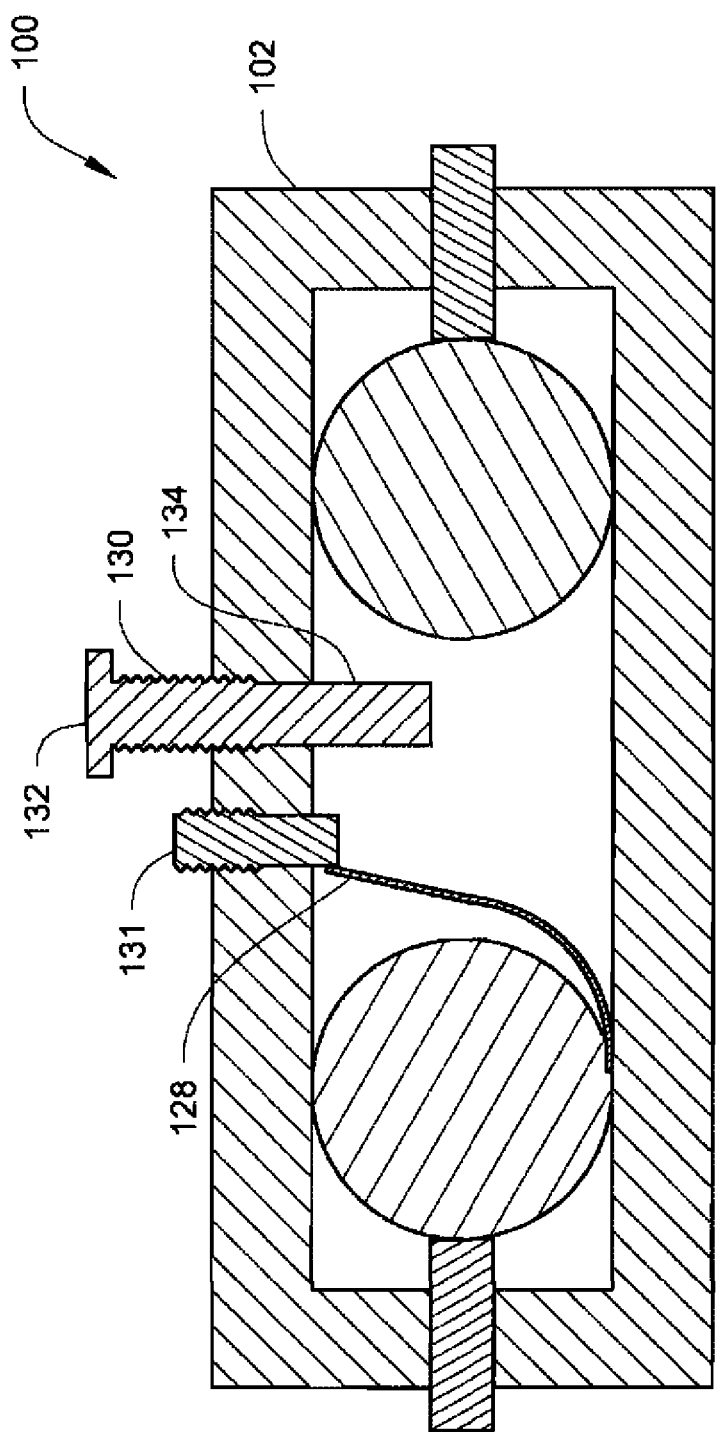
FIG. 13 shows the second step in arming the device.
Figure 14:
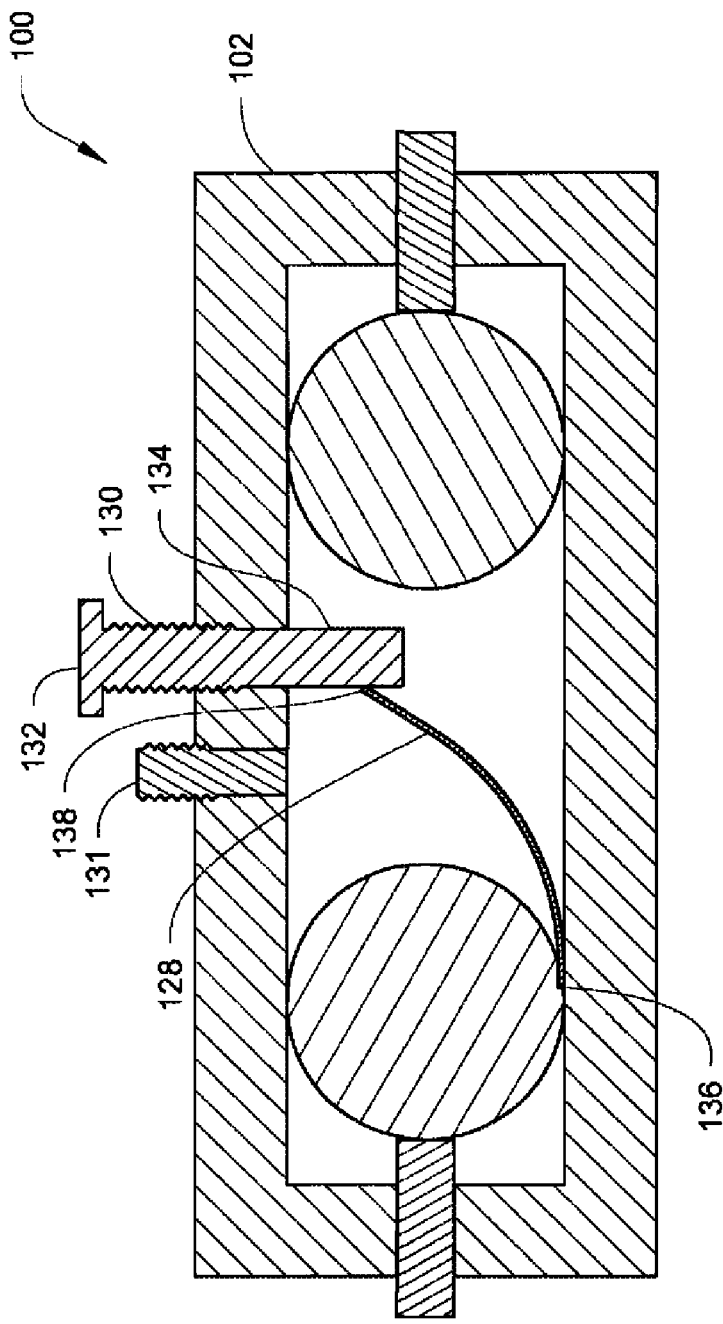
FIG. 14 shows the device fully armed.

FIGS. 12 through 14 illustrate the steps for setting up the tamper sensing device 100. FIG. 12 shows the first step in arming the device. A retainer hole 140 exists where the retainer 130 is to enter the case 102 and is located adjacent to the set screw 131. The set screw 131 is used to initially hold the light path interrupting element 128 in place. FIG. 13 shows the second step in arming the device. The set screw 131 remains in place holding the light path interrupting element 128 while the retainer 130 is installed through the hole 140 and into its pre-loaded position. The retainer 130 should be located close enough to the set screw 131 so that it may engage the light path interrupting element 128 when the case screw 131 is moved out of contact with the light interrupting element 128. FIG. 14 shows the tamper sensing device 100 when it fully armed. The set screw 131 has been withdrawn so that it is moved out of contact with the light path interrupting element 128 to enable the light path interrupting element 128 to move into its first position. When the set screw 131 is withdrawn, the light path interrupting element 128 snaps into engagement with the retainer 130. The retainer 130 holds the light interrupting element 128 in its first position until someone tries to remove the retainer 130 so that it moves into its disengaged position. The set screw 131 may be put back into the case 102 after the tamper sensing device 100 is armed.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An apparatus, comprising:
a case defining an enclosed volume;
an input optical fiber connected to the case that extends into the volume;
an output optical fiber connected to the case that extends into the volume;
a light path between the input optical fiber and the output optical fiber;
a light path interrupting element disposed within the enclosed volume, the light path interrupting element being movable from a first position at which it interrupts at least a portion of the light path so that a first amount of light can reach the output optical fiber to a second position at which a second amount of light can reach the output optical fiber, the first amount is different than the second amount; and
a retainer that extends through the case and into the interior volume, the retainer is moveable relative to the case from a retaining position to a disengaged position, and at the retaining position the retainer is engaged with the light path interrupting element to retain the light path interrupting element at the first position, and at the disengaged position the retainer is disengaged from the light path interrupting element and the light path interrupting element is at the second position.

2. The apparatus of claim 1, wherein the case has a plurality of walls.

3. The apparatus of claim 1 wherein the input optical fiber inputs a light beam carrying data and the output optical fiber is opposite the input optical fiber.

4. The apparatus of claim 1 further comprising an input lens located within the volume adjacent the input optical fiber and an output lens located within the volume adjacent the output optical fiber.

5. The apparatus of claim 1 wherein the light path interrupting element is a flap that is spring-loaded or a flap that is resiliently flexible.

6. The apparatus of claim 5 wherein the flap is sized so that it extends approximately halfway across the light path.

7. The apparatus of claim 1 wherein the retainer is a threaded fastener.

8. The apparatus of claim 1 wherein the retainer extends into and interrupts the light path at the retaining position.

9. The apparatus of claim 1 further comprising a set screw that extends through the case.

10. An apparatus, comprising:
a case defining an enclosed volume;
a light input means extending into the volume for introducing light into the volume;
a light output means extending from the volume for receiving light from the light input means to the case that extends into the volume;
a light path between the light input means and the light receiving means;
a light path interrupting means for interrupting the light path disposed within the enclosed volume, the light path interrupting means being movable from a first position at which it interrupts at least a portion of the light path so that a first amount of light can reach the output optical fiber to a second position at which a second amount of light can reach the output optical fiber, the first amount is different than the second amount; and
a retaining means for retaining the light interrupting means at the first position, the retaining means is moveable relative to the case from a retaining position to a disengaged position, and at the retaining position the retaining means is engaged with the light path interrupting means to retain the light path interrupting means at the first position, and at the disengaged position the retaining means is disengaged from the light path interrupting means and the light path interrupting means is at the second position.

11. The apparatus of claim 10 wherein the light input means inputs a light beam carrying data and the light output means is opposite the light input means.

12. The apparatus of claim 10 further comprising an input lens located within the volume adjacent the light input means and an output lens located adjacent the light output means.

13. An apparatus, comprising:
a case defining an enclosed volume;
an input optical fiber connected to the case that extends into the volume;
an output optical fiber connected to the case that extends into the volume and is located opposite the input optical fiber;
a light path between the input optical fiber and the output optical fiber, where a light beam carrying data input via the input optical fiber travels along the light path to the output optical fiber;
an input lens located within the volume adjacent the input optical fiber and an output lens located within the volume adjacent the output optical fiber;
a light path interrupting element disposed within the enclosed volume, the light path interrupting element being movable from a first position at which it interrupts at least a portion of the light path so that a first amount of light can reach the output optical fiber to a second position at which a second amount of light can reach the output optical fiber, the first amount is different than the second amount; and
a retainer that extends through the case and into the interior volume, the retainer is moveable relative to the case from a retaining position to a disengaged position, and at the retaining position the retainer is engaged with the light path interrupting element to retain the light path interrupting element at the first position, and at the disengaged position the retainer is disengaged from the light path interrupting element and the light path interrupting element is at the second position.

14. The apparatus of claim 13 wherein the light path interrupting element is a flap that is spring-loaded or resiliently flexible.

15. The apparatus of claim 14 wherein the flap is sized so that it extends approximately halfway across the light path.

16. The apparatus of claim 13 wherein the retainer is a threaded fastener.

17. The apparatus of claim 13 wherein the retainer extends into and interrupts the light path at the retaining position.

18. The apparatus of claim 13 further comprising a set screw that extends through the case and into the volume.

19. The apparatus of claim 13 wherein the data is not disrupted when the light path interrupting element moves from the first position to the second position.

20. The apparatus of claim 13 wherein data carried by the light beam reaches the output optical fibers when the light path interrupting element is in first position and when the light path interrupting element is in the second position.

* * * * *